(12) United States Patent
Tanaka (10) Patent No.: US 7,347,240 B2
(45) Date of Patent: Mar. 25, 2008

(54) RUNFLAT SYSTEM

(75) Inventor: Masatoshi Tanaka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 67 days.

(21) Appl. No.: 10/912,190

(22) Filed: Aug. 6, 2004

(65) Prior Publication Data

US 2005/0072506 A1    Apr. 7, 2005

(30) Foreign Application Priority Data

Oct. 7, 2003    (JP)    ............................. 2003-348571

(51) Int. Cl.
    *B60C 17/06*    (2006.01)
(52) U.S. Cl. .................. 152/381.5; 152/384; 152/400; 152/516
(58) Field of Classification Search ................ 152/158, 152/516, 520, 381.5, 381.6, 384, 400, 323; 305/184; 474/184, 185, 186
    See application file for complete search history.

(56) References Cited

U.S. PATENT DOCUMENTS

| | | | |
|---|---|---|---|
| 1,949,501 A * | 3/1934 | Thacher ...................... | 73/487 |
| 2,427,216 A * | 9/1947 | Kraft ........................... | 152/384 |
| 2,701,971 A * | 2/1955 | Carter et al. ................. | 474/192 |
| 4,372,365 A * | 2/1983 | Osada et al. ................. | 152/158 |
| 4,549,592 A * | 10/1985 | Schroder ..................... | 152/328 |
| 4,676,288 A | 6/1987 | Zinnen | |
| 4,923,252 A * | 5/1990 | Plamper et al. ........ | 301/64.704 |
| 5,313,994 A | 5/1994 | Hill, III et al. | |
| 5,361,817 A * | 11/1994 | Chen ........................... | 152/520 |
| 5,542,752 A * | 8/1996 | Quaglia .................. | 301/64.702 |
| 5,630,891 A * | 5/1997 | Peterson et al. ............ | 152/165 |
| 5,690,762 A | 11/1997 | Bock et al. | |
| 6,035,913 A * | 3/2000 | Bapt et al. ................ | 152/381.4 |
| 6,415,839 B1 * | 7/2002 | Pompier et al. ......... | 152/381.4 |
| 6,470,936 B2 * | 10/2002 | Pauc et al. ............... | 152/379.5 |
| 6,478,387 B1 * | 11/2002 | Rayman ...................... | 305/19 |
| 6,564,842 B2 * | 5/2003 | Abinal et al. .............. | 152/516 |
| 6,814,114 B2 * | 11/2004 | Bouvier et al. ............. | 152/158 |
| 2001/0052378 A1 * | 12/2001 | Masson et al. ............. | 152/516 |
| 2003/0209301 A1 * | 11/2003 | Pompier et al. ............ | 152/158 |
| 2005/0072504 A1 * | 4/2005 | White et al. ................ | 152/158 |

FOREIGN PATENT DOCUMENTS

DE    92 06 460.4 U1    9/1992

(Continued)

*Primary Examiner*—Russell D. Stormer
(74) *Attorney, Agent, or Firm*—Birch, Stewart, Kolasch & Birch, LLP (57) ABSTRACT

A runflat tire system comprising a pneumatic tire, a wheel rim and a support ring disposed in a tire cavity is disclosed, wherein the wheel rim comprises a pair of axially spaced bead seats, and a support-ring seat between the bead seats; the support ring has an inner circumferential surface fitting to the above-mentioned support-ring seat, and an outer circumferential surface contacting with the inside of a tread portion of the tire mounted on the wheel rim when the tire is deflated; and one of or alternatively each of the support-ring seat and the inner circumferential surface is provided with an ordered uneven surface which can reduce a friction in the axial direction between the inner circumferential surface and the support-ring seat, while maintaining or increasing the friction in the circumferential direction.

10 Claims, 7 Drawing Sheets

| | FOREIGN PATENT DOCUMENTS | | |
|---|---|---|---|
| EP | 0356798 | * | 3/1990 |
| FR | 2 588 802 A1 | | 4/1987 |
| GB | 2238513 | * | 6/1991 |
| JP | 7-149118 A | | 6/1995 |
| JP | 8-504389 A | | 5/1996 |
| JP | 9-509122 A | | 9/1997 |
| JP | 10-6721 A | | 1/1998 |
| JP | 2001-354002 A | | 12/2001 |
| WO | WO-94/13498 A1 | | 6/1994 |
| WO | WO-95/23073 A1 | | 8/1995 |
| WO | WO 01/32450 A1 | | 5/2001 |

* cited by examiner

RUNFLAT SYSTEM

This Non-provisional application claims priority under 35 U.S.C. § 119(a) on Patent Application No(s). 2003-348571 filed in Japan on Oct. 7, 2003, the entire contents of which are hereby incorporated by reference.

The present invention relates to a runflat system comprising a pneumatic tire, wheel rim and support ring disposed in the tire cavity, more particularly to a combination of a wheel rim and support ring improved in the boundary construction therebetween.

As a device capable of running for a relatively long distance safely at a normal speed even if a pneumatic tire gets punctured, a support ring made of an elastomer disposed in the tire cavity to support a tire load comes into practical use in recent years. As well know in the art, a typical successful example can be seen in the Michelin PAX runflat system. In this system, the support ring is an annular body whose center hole has a smooth surface, and the support ring is press fitted to its seat which is provided on the wheel rim as a smooth surface. The binding force between the support ring and the wheel rim relies on the elastic behavior of the support ring. Therefore, if the elastomer deteriorates with age and/or high temperature from the brake disk and the like, there is a tendency for the binding force to decrease. If the binding force is decreased, the support ring is rotated relatively to the wheel rim at the time of sudden stop and sudden acceleration in particular. As a result, the wheel is very liable to lose a dynamic balance.

If the inner diameter of the support ring is decreased relatively to the outer diameter of the support-ring seat of the wheel rim so that a necessary binding force remains finally, it becomes very difficult to press fit the support ring to the rim.

Therefore, a primary object of the present invention is to provide a runflat system being capable of preventing the degradation in the dynamic wheel balance, without making the mounting operation difficult.

Another object of the present invention is to provide a support ring and/or a wheel rim for use in the runflat system, which can increase the binding force or circumferential engaging force between the support ring and the wheel rim, and also which can improve the mounting or fitting of the support ring onto the wheel rim's support-ring seat.

According to one aspect of the present invention, a combination of: a wheel rim comprising a pair of axially spaced bead seats, and a support-ring seat between the bead seats; and a support ring disposed in a tire cavity and having an inner circumferential surface fitting to the above-mentioned support-ring seat, and an outer circumferential surface contacting with the inside of a tread portion of the tire mounted on the wheel rim when the tire is deflated, is characterized in that one of or alternatively each of the support-ring seat and the inner circumferential surface is provided with an ordered uneven surface for reducing a friction in the axial direction between the inner circumferential surface and the support-ring seat.

Embodiments of the present invention designed with compatibility with the PAX runflat system in mind will now be described in detail in conjunction with the accompanying drawings.

According to the present invention, a runflat system comprises: a wheel rim 3, 3'; a pneumatic tire 2 to be mounted thereon; and a support ring 4, 4' to be disposed in the tire cavity (i) and mounted on the wheel rim.

Figure 1A:
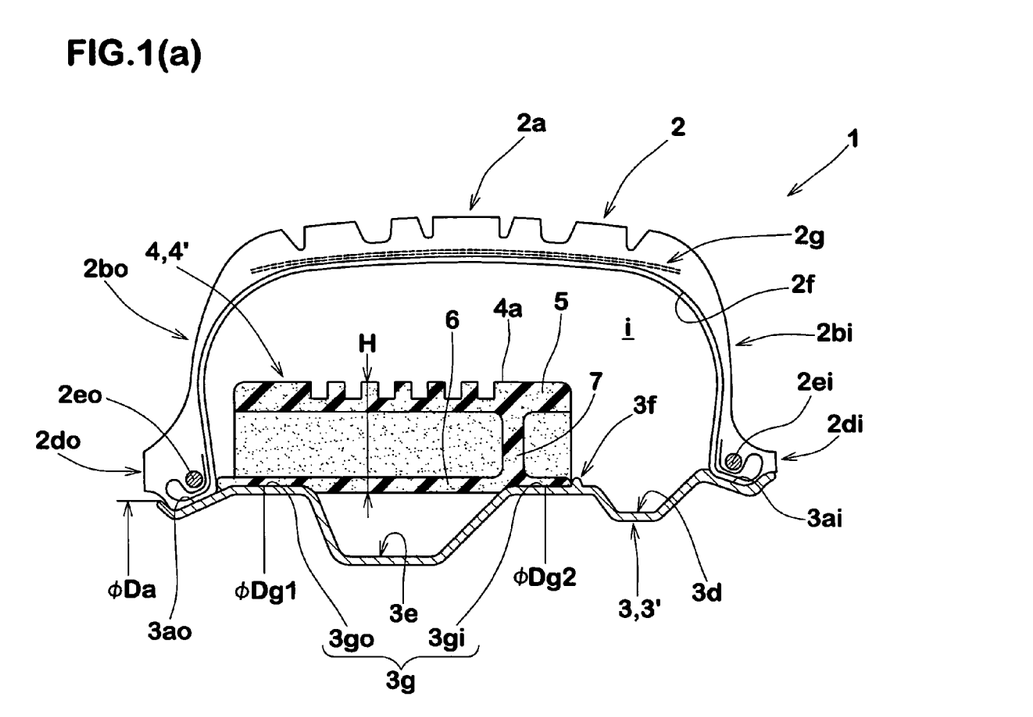
FIG. 1(a) is a cross sectional view of an assembly of a pneumatic tire, wheel rim and support ring according to the present invention, showing such a condition that the tire is normally inflated and no tire load is applied.
Figure 1B:
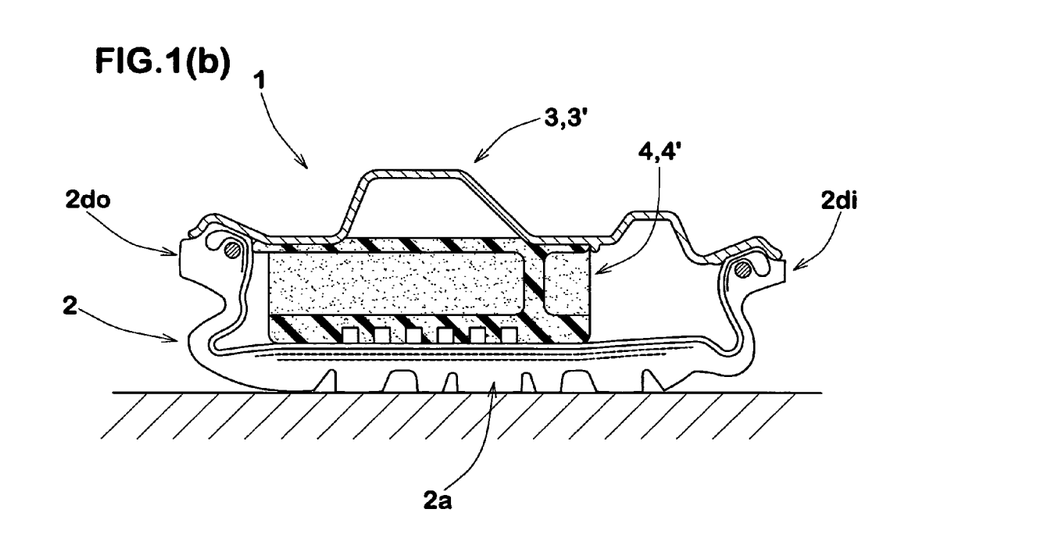
FIG. 1(b) is a cross sectional view of the same assembly in the ground contacting patch when a normal tire load is applied and the tire is deflated.

FIGS. 1A and 1B show an assembly 1 of such pneumatic tire, wheel rim and support ring.

The pneumatic tire 2 comprise: a tread portion 2a with tread edges; a pair of sidewall portions 2bo and 2bi extending radially inwardly from the respective tread edges; a pair of bead portions 2do and 2di at the radial inner ends of the sidewall portions 2bo and 2bi, respectively; a pair of bead cores 2eo and 2ei disposed in the bead portions 2do and 2di, respectively; a carcass 2f comprising at least one ply of radially arranged cords extending between the bead portions 2do and 2di through the tread portion 2a and sidewall portions 2bo and 2bi and secured in the bead portions 2do and 2di by the bead cores 2eo and 2ei; and a tread reinforcing belt 2g disposed radially outside the carcass 2f in the tread portion 2a and comprises at least two cross breaker plies of cords (for example steel cords).

The tire is a so called tubeless tire, namely, the inner surface of the tire 2 is covered with an air impermeable rubber as a conventional inner liner or a topping rubber layer of the innermost carcass ply.

The inner diameter of the outer bead portion 2do is smaller than that of the inner bead portion 2di.

In this embodiment, as shown in FIG. 1(a), in each of the bead portions 2d, the carcass ply 2f extends to the axially outside of the bead core 2e, passing through radially inside the bead core 2e. On the axially outside the bead core 2e, it is turned back and then extends to the axially inside of the bead core 2e, passing between the bead core 2e and the above-mentioned axially outwardly extending carcass ply portion. Then, it is terminated on the axially inside of the bead core 2e. Further, the bead bottom is tapered axially outwards reversely to that in the conventional tires.

The wheel rim 3, 3' comprises: a pair of bead seats 3ao and 3ai for the bead portions 2do and 2di, respectively; a seat 3g for the support ring 4 (hereinafter, the support-ring seat 3g) between the bead seats 3ao and 3ai; and a rim well 3d between the bead seat 3ai and support-ring seat 3g. corresponding to the bead portions 2do and 2di having different diameters, the bead seats 3ao and 3ai also have different diameters.

In this embodiment, according to the taper of the tire bead bottom, both of the bead seats 3ao and 3ai are tapered axially outwardly, namely, reversely to the conventional wheel rim. The support-ring seat 3g is divided into two parts 3go and 3gi by a deep and wide circumferential groove 3e. The provision of the central groove 3e is not essential. Thus, the support-ring seat 3g may be an axially continuous single surface. The outer diameters Dg1 and Dg2 (generically, "Dg") of the support-ring seat 3go and 3gi, respectively, are the same values. The outer diameters Dg is larger than the outer diameter Da measured at the radially outer end of the flange extending radially outwardly and axially outwardly from the axial end of the outer bead seat 3ao.

At the axial end of the support-ring seat 3g on the inner bead seat 3ai side, a circumferential protrusion 3f is provided in order to prevent axial displacement of the support ring 4 mounted on the support-ring seat 3g.

The support ring 4, 4' comprises: a radially outer annular part 5 defining an outer circumferential surface 4a of the support ring 4 which comes into contact with the inner surface of the tread portion 2a as shown in FIG. 1(b) when the tire is deflated; a radially inner annular part 6 defining the inner circumferential surface 4b of the support ring 4 which fits to the support-ring seat 3g of the wheel rim 3, 3'; and a support wall 7 extending continuously in the circumferential direction while bridging between the outer annular part 5 and inner annular part 6.

The support ring 4, 4' is made of an elastomeric material. It is preferable that the elastomeric material has: a JIS hardness of not less than 80 degrees; a tensibility (EB) of not less than 200%, preferably more than 250% but not more than 350%; and a loss tangent (tan delta) of not more than 0.15, preferably not more than 0.10. For example, various rubber compounds, polyurethane, ethylene propylene diene monomer (EPDM) and the like can be used. More specifically, a rubber compound having a JIS hardness of about 85 degrees, a polyurethane having a JIS hardness of about 95 degrees, and the like can be used for example.

The radial height H of the support ring 4, 4' is determined such that, under the normally inflated condition of the tire as shown in FIG. 1(a), even if the tire 2 is subjected to a tire load of over the maximum tire load, it does not contact with the inside of the tread portion 2. It is thus, preferable that the radial height H is set in a range of from 40 to 60% of the cross sectional height of the tire cavity under the normally inflated condition.

In a cross section including the rotational axis (or tire axis), the shape of the outer annular part 5 is generally a flat rectangle which is long in the axial direction, and the shape of the inner annular part 6 is also a flat rectangle which is long in the axial direction. In this example, on the outer bead seat 3ao side, the inner annular part 6 protrudes in the axial direction from the axial end of the outer annular part 5. Thus, the inner annular part 6 is wider than the outer annular part 5. The protruding part comes into contact with or very close to the inside of the outer bead portion 2do.

The inner annular part 6 may be reinforced with circumferentially extending parallel cords or spirally wound cord(s) in case of rubber in particular although in this embodiment such pull-resistant reinforcing elements are not used.

Figure 2:
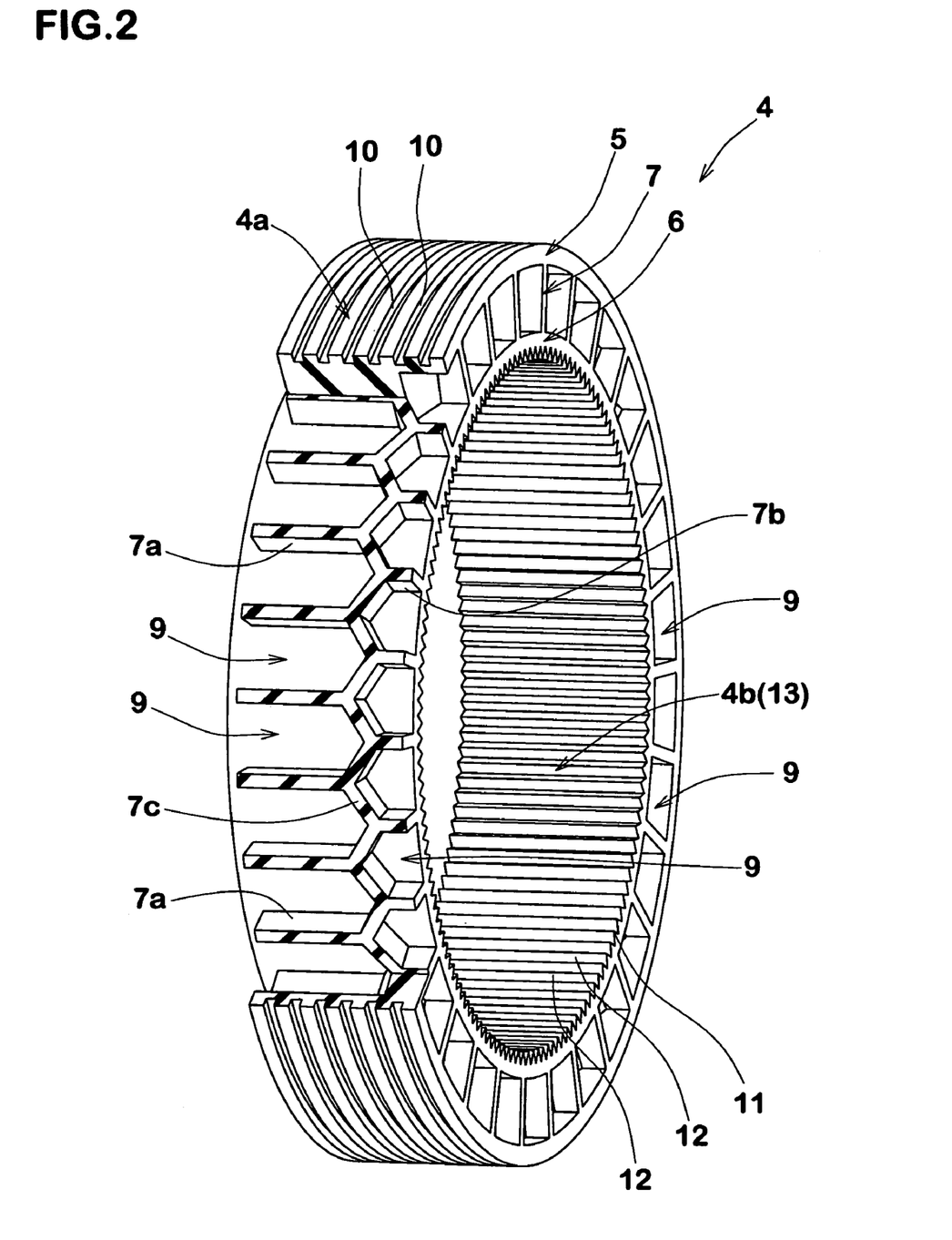
FIG. 2 is a perspective view of the support ring, showing an example provided with an uneven surface in accordance with the present invention.

In this example, the support wall 7 comprises: a circumferential wall 7c extending continuously in the circumferential direction; circumferentially-spaced long axial walls 7a extending from one side of the circumferential wall 7c towards an edge of the support ring 4; and circumferentially-spaced short axial walls 7b extending from the other side of the circumferential wall 7c towards the other edge of the support ring 4. AS shown in FIG. 2, the circumferential wall 7c is off-centered and extends in a zigzag fashion, and the long and short axial walls 7a and 7b extend substantially straightly from the peaks of zigzag in parallel with the axial direction. The support ring 4 is therefore, provided with hollows 9 each opened on one side of the support ring and thereby the openings are staggered.

Preferably, each support wall has a thickness of from about 5 mm to about 10 mm. The circumferential pitch of the long axial walls 7a and the circumferential pitch of the short axial walls 7b are in a range of about 15 mm to about 25 mm.

The outer circumferential surface 4a of the support ring 4 in this example is provided with a plurality of circumferentially extending parallel grooves 10 in order to control generation of frictional heat when the outer circumferential surface 4a contacts with the inside of the tread portion 2a, and to promote heat radiation, and further to provide moderate suppleness being capable of following the deformation of the tread portion during runflat operation.

In use, a lubricant is usually applied between the outer circumferential surface 4a of the support ring 4 and the inside of the tread portion 2a in order to improve the durability of the support ring 4.

According to the present invention, one of or both of the support ring and heel rim are provided with an ordered uneven surface.

The support ring 4 is provided in the inner circumferential surface 4b with an uneven surface 13 whereas the support ring 4' is not provided.

In FIG. 2, the uneven surface 13 is formed by a large number of depressions 12 and resultant protrusions 11 which are formed by the remaining part.

The depressions 12 in this example are parallel small v-shaped grooves extending from one of the axial edges to the other. The circumferential pitch Pa of the depressions 12 or the small grooves is substantially equal to the groove width Gwa. As a result, the protrusion 11 has a pointed vertex, whereby the depressions 12 and protrusions 11 in a form of serration are formed.

It is preferable that: the groove width GWa is 0.3 to 3.0 mm; the circumferential pitch Pa is not less than 0.3 mm and not more than 4.0 mm; and the ratio (GWa/Pa) of the groove width GWa and circumferential pitch Pa is set in a range of 0.2 to 1.0, more preferably 0.4 to 1.

Figure 3A:
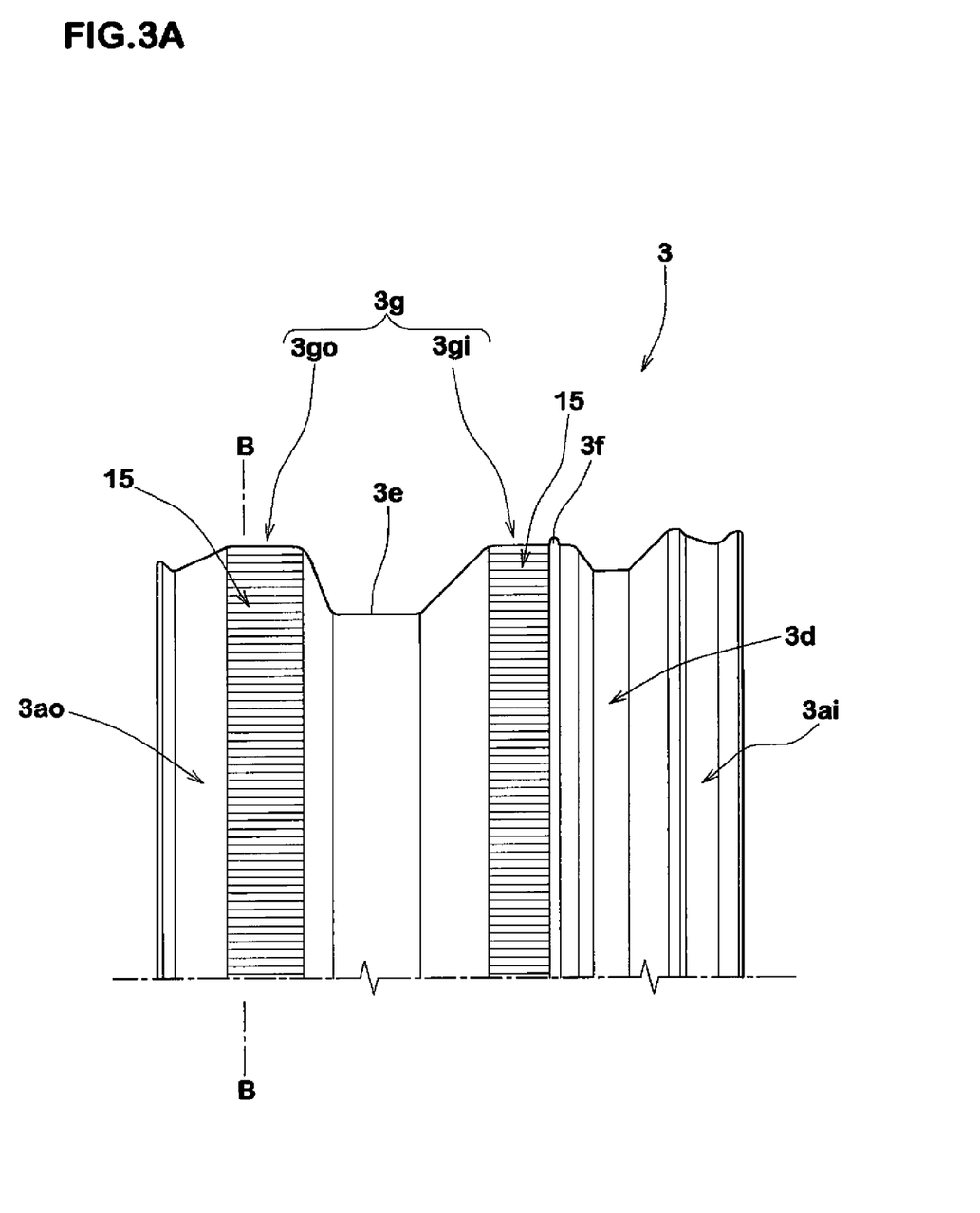
FIG. 3A is an elevational view of an upper half of the wheel rim, showing an example provided with one type of an uneven surface in accordance the present invention.
Figure 3B:
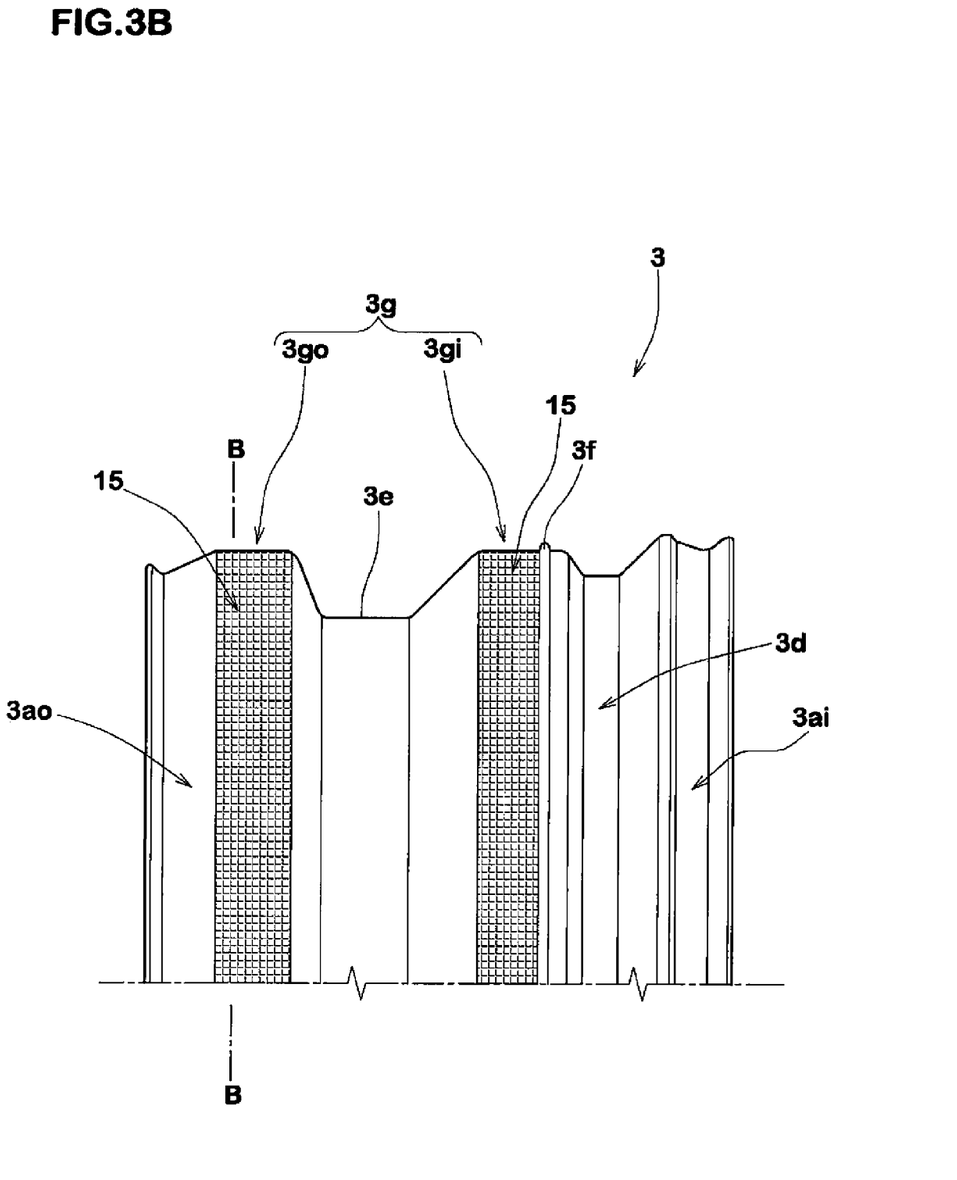
FIG. 3B is an elevational view of an upper half of the wheel rim, showing an example provided with another type of an uneven surface in accordance the present invention.

The wheel rim 3 is provided in the support-ring seat 3g with an uneven surface 15 as shown in FIG. 3A and FIG. 3B, whereas the wheel rim 3' is not provided.

The uneven surface 15 can be formed to accommodate to the above-mentioned uneven surface 13 of the support ring 4 to derive a maximum engaging force therebetween when combined with the support ring 4 (not 4').

Figure 4:
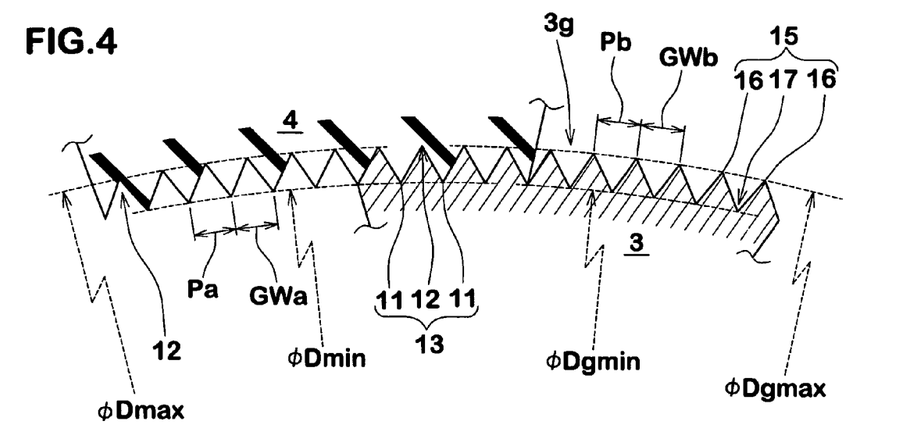
FIG. 4 is an enlarged schematic cross sectional view showing a combination of a support ring and a wheel rim each provided with uneven surface.

In the example shown in FIGS. 3A and 4, the uneven surface 15 is made up of depressions 17 and protrusions 16 similar to the protrusions 11 and depressions 12 of the support ring 4. The depressions 17 are parallel small grooves extending in parallel with the axial direction across the entire axial width of the support-ring seat 3g, namely, the two parts 3go and 3gi in this particular example. The grooves are V-shaped in the cross section and are arranged at the circumferential pitch Pb substantially equal to the groove width Gwb. The resultant protrusions 16 are thus formed by the remaining part other than the depressions 17. As a result, the protrusion 16 has a pointed vertex, whereby the depressions 17 and protrusions 16 in a form of serration are formed.

In this example, the groove width Gwb of the depressions 17 and the circumferential pitch Pb of the depressions 17, are determined so that the depressions 17 and protrusions 16 can fit to the protrusions 11 and depressions 12 of the support ring 4. However, it is not always necessary that the unevenness of the support-ring seat 3g exactly fits to that of the support ring 4. Only desirability is that: similarly to the support ring 4, the groove width Gwb is set in a range of from 0.3 to 2.0 mm; and the pitch Pb is set in a range of not less than 0.3 mm but not more than 4.0 mm; and further the ratio (Gwb/Pb) of the groove width Gwb and pitch Pb is set in a range of from 0.2 to 1.0, more preferably 0.4 to 1.0.

In the above examples, as the uneven surface 13, 15 is formed by the axially continuously extending small grooves, the frictional force in the axial direction is effectively reduced to facilitate the operation of mounting the support ring on the rim, without decreasing the frictional force in the circumferential direction. Thus, unwanted rotation of the support ring relative to the wheel rim which causes rotational imbalance can be effectively prevented. Further, such a surface, namely, serration has such advantage that the serration can be formed easily and stably with a split mold during molding the support ring.

In FIG. 4, the support ring 4 with the uneven surface 13 and the wheel rim 3 with the uneven surface 15 are combined. In this example, the uneven surface 13 and the uneven surface 15 have substantially same configurations so as to be able to closely contact with each other. When the uneven surface 13 and the uneven surface 15 have substantially same configurations and thus can fit to each other, the difference Dgmax-Dmax and/or the difference Dgmin-Dmin are preferably set in a range of not less than 0.4 mm preferably more that 0.6 mm, but not more than 4.0 mm preferably less than 3.0 mm. Dgmax is the maximum outer diameter of the support-ring seat 3g defined at the outer ends (vertexes) of the protrusions 16. Dgmin is the minimum outer diameter of the support-ring seat 3g defined at the bottom of the depressions 17. Dmax is the maximum inner diameter of the support ring 4 defined at the bottom of the depressions 12. Dmin is the minimum inner diameter of the support ring 4 defined at the inner ends (vertexes) of the protrusions 11.

When the uneven surface 13 and the uneven surface 15 have different configurations and thus it is difficult to fit each other, the difference Dgmax-Dmin (when the outer ends of the protrusions 16 contact with the inner ends of the protrusions 11) or the difference Dgmin-Dmin (when the inner ends of the protrusions 11 reach to the bottom of the depressions 17) or the difference Dgmax-Dmax (the outer ends of the protrusions 16 reach to the bottom of the depressions 12) is set in the above-mentioned range.

Figure 5:
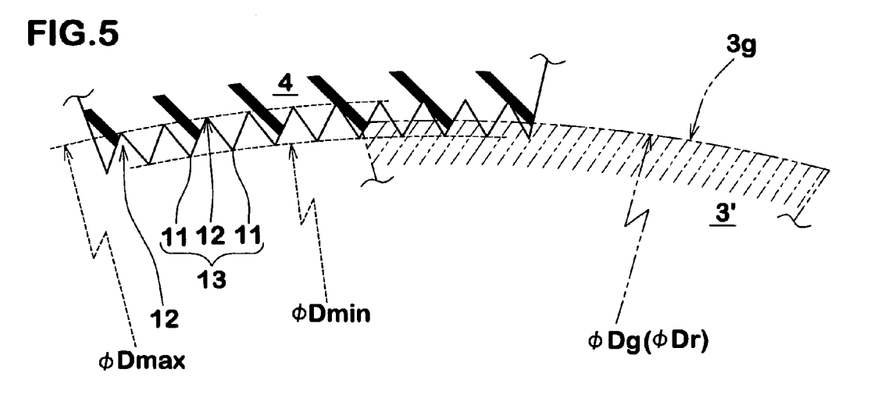
FIG. 5 is an enlarged schematic cross sectional view showing a combination of a support ring provided with uneven surface and a wheel rim not provided with uneven surface.

Further, as shown in FIG. 5, the support ring 4 with the uneven surface 13 can be combined with a wheel rim 3'. As explained above, the wheel rim 3' is the same as the above-mentioned wheel rim 3, excepting that the support-ring seat 3g is not provided with the uneven surface 15 and thus it is a smooth surface. In order to make an suitable interference fit between the support ring 4 and the wheel rim 3', the difference Dg-Dmin is set in a range of not less than 0.4 mm preferably more that 0.6 mm, but not more than 4.0 mm preferably less than 3.0 mm. Dg is the outer diameter of the support-ring seat 3g of the wheel rim 3'.

Further, in order to maintain the required circumferential friction while decreasing the axial friction, the maximum inner diameter Dmax of the support ring 4 is preferably set to be 0.4 mm to 4.0 mm larger than the minimum inner diameter Dmin. More preferably, the difference Dmax-Dmin therebetween is set in range of from 0.6 to 3.0 mm. In other words, the depth of the grooves or depressions 12 is set in a range of not less than 0.4 mm preferably more that 0.6 mm, but not more than 4.0 mm preferably less than 3.0 mm.

Figure 6:
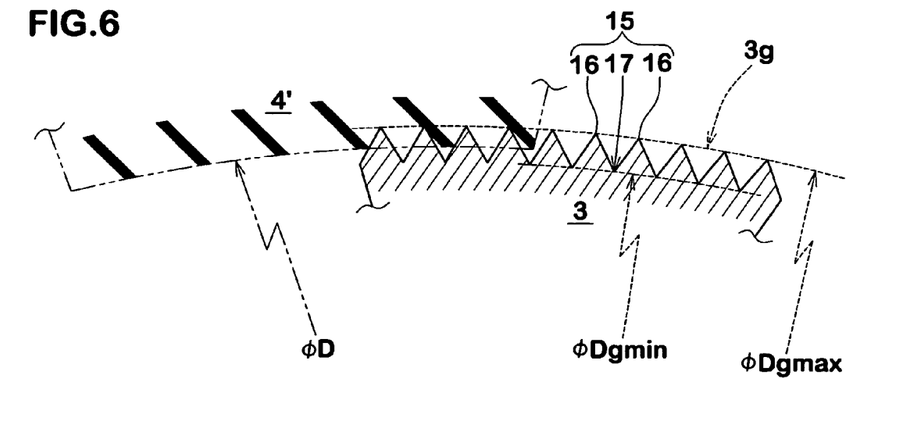
FIG. 6 is an enlarged schematic cross sectional view showing a combination of a wheel rim provided with uneven surface and a support ring not provided with uneven surface.

Furthermore, as shown in FIG. 6, the wheel rim 3 with the uneven surface 15 can be combined with a support ring 4'. The support ring 4' is the same as the support ring 4, excepting that the inner circumferential surface 4b is not provided with the uneven surface 13 and thus it is a smooth surface. Similarly to the above, in order to make an suitable interference fit between the support ring 4' and the wheel rim 3, the maximum outer diameter Dgmax of the support-ring seat 3g is preferably set to be 0.4 mm to 4.0 mm larger than the inner diameter D of the support ring 4'. More preferably, the difference Dgmax-D therebetween is set in a range of from 0.6 to 3.0 mm. Further, in order to maintain the required circumferential friction while decreasing the axial friction, the depth of the grooves or depressions 17 is preferably set in a range of not less than 0.4 mm, more preferably more that 0.6 mm, but not more than 4.0 mm, more preferably less than 3.0 mm.

When the support ring is made of an elastomeric material having a higher tensibility, it is also possible that in case of FIG. 5, the maximum inner diameter Dmax is substantially equal to or smaller than the outer diameter Dg, and that in case of FIG. 6, the inner diameter D is substantially equal to or smaller than the minimum outer diameter Dgmin.

Further, as to the uneven surface 15 of the wheel rim 3, it is also possible to set the maximum outer diameter Dgmax or the minimum outer diameter Dgmin as being substantially equal to the standardized outer diameter Dr of the smooth support-ring seat 3g of the standardized wheel rim 3'.

But, in any case, it is preferable that the maximum outer diameter Dgmax is set to be 0.4 to 3.0 mm, more preferably 0.5 to 2.5 mm, larger than the standardized outer diameter Dr. On the other hand, the minimum diameter Dgmin is preferably set to be 0.4 to 3.0 mm smaller than the above-mentioned standardized outer diameter Dr.

In the above embodiments, the standardized outer diameter of the support-ring seat means the values specified in the Michelin PAX runflat system because higher compatibility therewith is sought. Therefore, if compatibility with another system or standard (if applicable, such as ETRTO, JATMA, T&RA or the like) is sought, the standardized outer diameter has to comply with the standard.

As explained above, the uneven surfaces 13 and 15 are formed by the v-shaped small grooves having a specific width arranged at a specific circumferential pitch. But, various shapes or configurations can be used in the depressions and also protrusions.

Figures 7, 7A, 8, 8A:
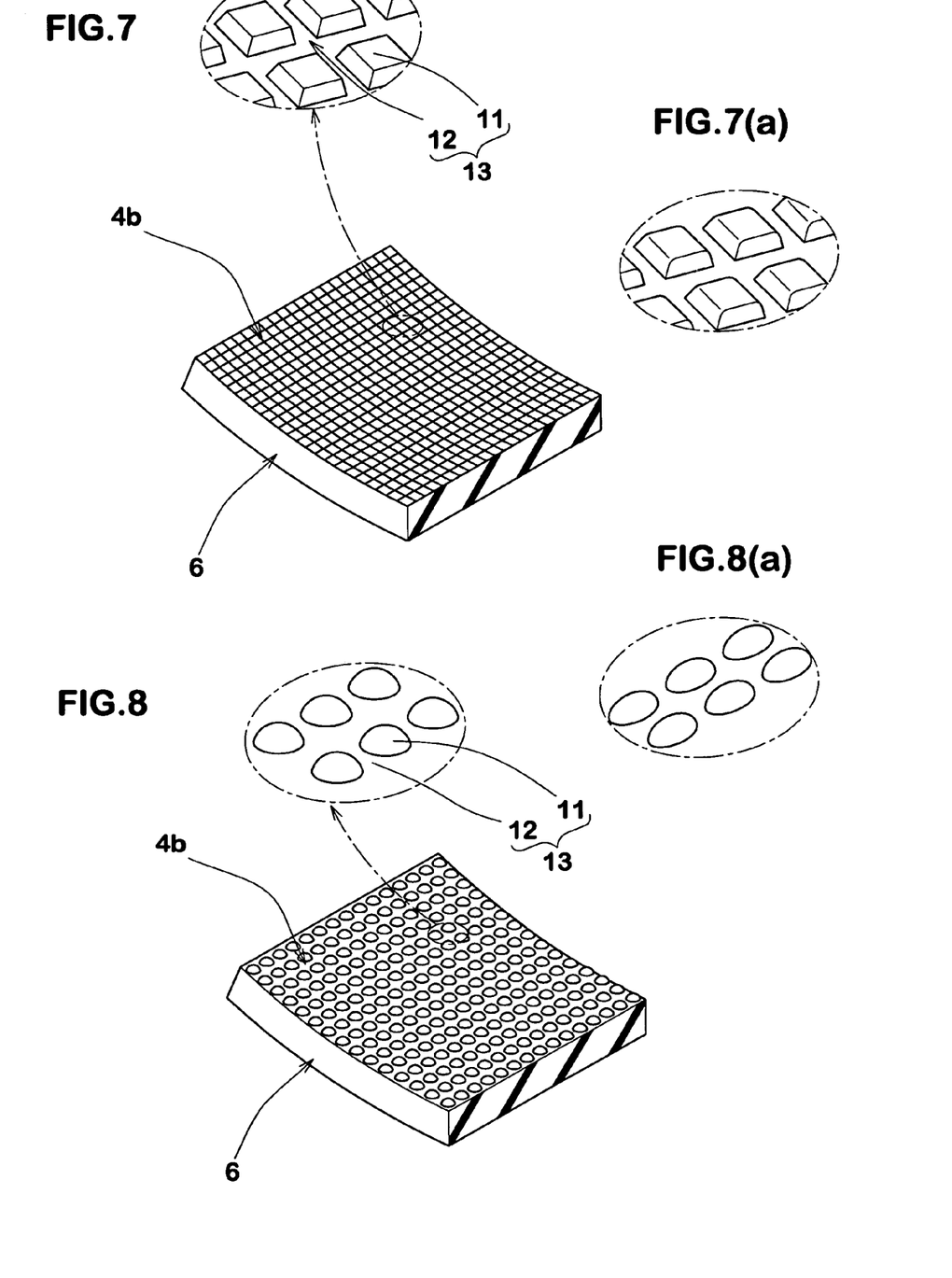
FIG. 7 is a perspective view showing another example of the uneven surface for the support ring or wheel rim.
FIG. 7(a) is a perspective view showing a modification thereof.
FIG. 8 is a perspective view showing still another example of the uneven surface for the support ring or wheel rim.
FIG. 8(a) is a perspective view showing a modification thereof.

FIG. 7 and FIG. 8 show other examples of the uneven surface. These examples are shown as the uneven surfaces 13 for the support ring 4, but it is of course possible to use in the uneven surfaces 15 of the wheel rim 3, as shown in FIG. 3B.

In FIG. 7, the depressions 12 in a form of square mesh is formed by a large number of parallel axial grooves and a large number of parallel circumferential grooves, whereby the protrusions 11 of a rectangular parallelepiped are formed.

FIG. 8 shows a modification of the uneven surface 13 shown in FIG. 7, wherein the protrusions 11 are formed as hemispherical. As a further modification, inversely thereto, hemispherical depressions 12 may be provided like the dimples of a golf ball.

In case of multiple independent protrusions like in FIGS. 7 and 8, it is preferred that the protrusions are configured such that the frictional force in the axial direction becomes smaller than that in the circumferential direction. This can be achieved by changing the aspect ratio of the protrusion in its plan view and/or selectively forming a sharp edge and round edge. For example, the axial edge is formed as a sharp edge and the circumferential edge is formed as a round edge as shown in FIG. 7(a). Further, as show in FIG. 8(a), the protrusion 11 is formed to be long in the axial direction than the circumferential directions.

Further, instead of the v-shaped cross sectional shape, u-shaped, square-shaped, semicircular cross sectional shape and the like may be used for the depressions 12 (not only small-groove type depressions but also depressions in the multiple-independent type protrusions).

Furthermore, as to the overall structure of the support ring 4, various shapes may be employed as far as it can support and withstand the tire load.

Still furthermore, a combination of different types of uneven surfaces 13 and 15 can be possible, for example, a combination of a FIG. 2 type uneven surface and a FIGS. 7-8 type uneven surface which are provided on the wheel rim and support ring, respectively, and vice versa. Even in such a combination, as the protrusions and depressions are engaged, the circumferential frictional force is greatly increased, while effectively decreasing the axial frictional force.

Figure 9A:
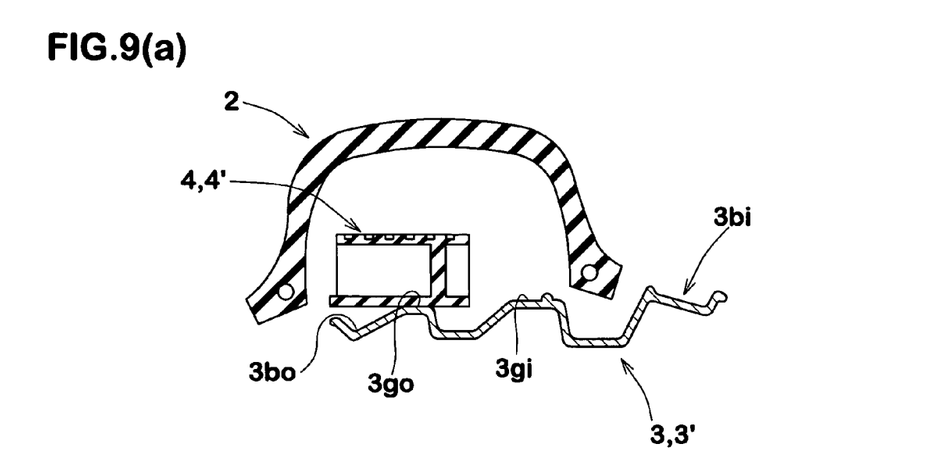
FIGS. 9(a), 9(b) and 9(c) are schematic cross sectional views for explaining the mounting operation of the support ring and tire.
Figure 9B:
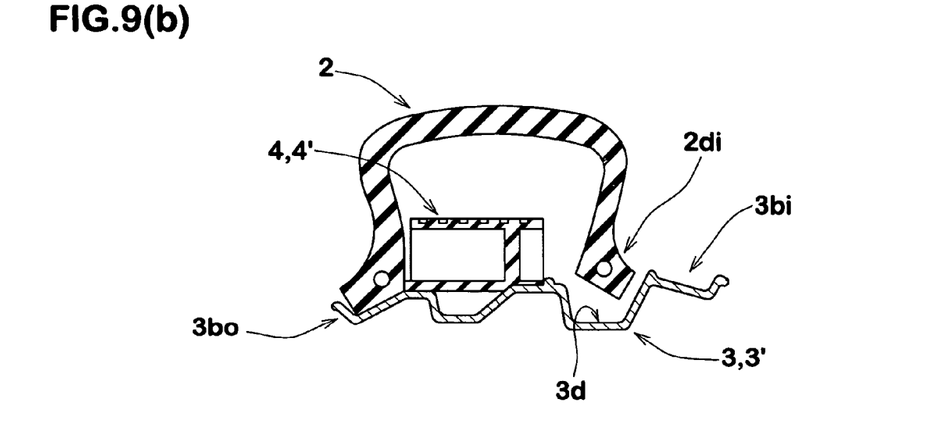
Figure 9C:
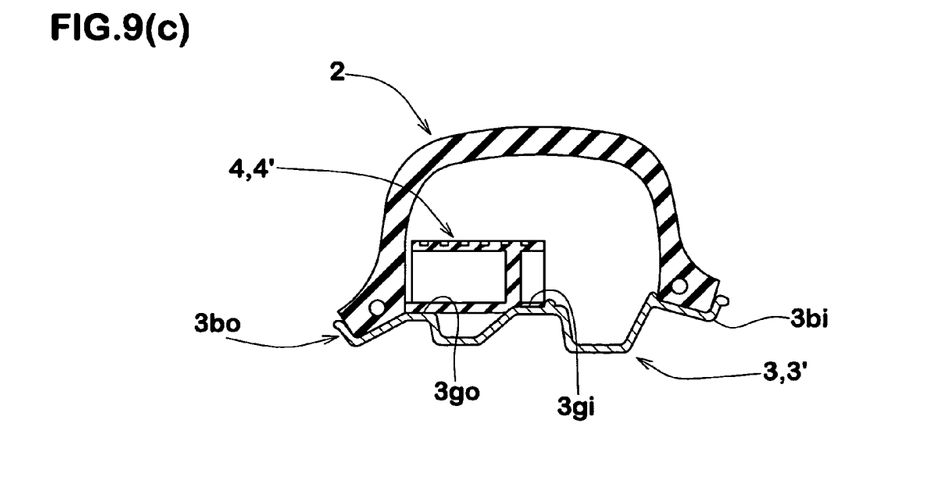

FIGS. 9(a), 9(b) and 9(c) show the process of mounting the tire 2 and support ring 4, 4' on the wheel rim 3, 3'.

First, the support ring is put inside the tire, and into the center holes thereof, the wheel rim is inserted from the outer bead seat 3ao side. As the outside diameter of the outer bead seat 3ao is small, the outer bead seat 3ao can pass over the support ring 4 without difficulty. Also the inner bead portion 2di can reach to the rim well 3d without difficulty. By sliding the support ring towards the inner bead seat 3ai, the support ring is set in the mounting portion 3g. The outer bead portion 2do passes over the flange of the outer bead seat 3ao by force, and it is seated on the outer bead seat 3ao. By applying tire pressure, the inner bead portion 2di is seated on the inner bead seat 3ai, while partially placing the inner bead portion 2di in the rim well 3d to pass over the hump at the axially inner end of the inner bead seat 3ai. To prevent wear and heat generation and thereby to increase the runflat distance, lubricant is preferably applied to the outer circumferential surface 4a of the support ring and/or the inner surface of the tread portion 2a.

Comparison Tests

With respect to a combination A of the support ring 4 and wheel rim 3' as shown in FIG. 5, a combination B of the wheel rim 3 and support ring 4' as shown in FIG. 6, and a combination c of the support ring 4 and wheel rim 3 as shown in FIG. 4, the following tests were carried out.

Binding Force Test:

The binding force between the inner circumferential surface of the support ring and the support-ring seat of the wheel rim, was measured at six positions within the part 3gi of the support-ring seat. The mean value for the six measuring positions is shown in Tables 1, 2 and 3.

Mounting Test:

Skilled workers evaluated the mounting of the support ring when the support ring is fitted to the support-ring seat of the wheel rim by axially sliding the ring to its position.

Circumferential Displacement Test:

The support ring was mounted on the wheel rim, and the wheel rim was rotated at high speed and made a quick stop within a time period of three seconds, and the lowest rotational speed at which a relative circumferential displacement or rotation was caused between the support ring and the support-ring seat by inertia was measured.

In the above tests, pneumatic tires were not used. Common specifications of the wheel rim and support ring are as follows:

The wheel rim size was 225×460A.

The support ring size was 80-460(45), namely, the nominal width of the support ring was 80 mm, the nominal diameter was 460 mm, and the radial height was 45 mm.

The support ring had the basic structure shown in FIG. 2 and was made from polyurethane.

Uneven surfaces 13 and 15 were formed by carving V-shaped small grooves as explained above.

The test results are shown in Tables 1, 2 and 3.

TABLE 1

| Combination A | Ref. 1 | EX. 1 | EX. 2 | EX. 3 |
|---|---|---|---|---|
| Wheel rim 3' | | | | |
| Support ring seat | smooth | smooth | smooth | smooth |
| Outer diameter Dg (mm) | 469 | 469 | 469 | 469 |
| Support ring 4 | | | | |
| Uneven surface 13 | none (smooth) | provided | provided | provided |
| Minimum inner diameter Dmin (mm) | 467.4 | 467.4 | 466.8 | 464 |
| Maximum inner diameter Dmax (mm) | 467.4 | 468.2 | 468.2 | 468.2 |
| Depression | | | | |
| Groove width GWa (mm) | — | 2 | 1.2 | 2 |
| Circumferential pitch Pa (mm) | — | 2 | 2 | 3 |
| Binding force (N) | 1620 | 1290 | 1410 | 1710 |
| Mounting | difficult | easy | easy | difficult |
| Displacement speed (km/hr) | 270 | 270 | 320 | 380 |

TABLE 2

| Combination B | Ref. 1 | EX. 4 | EX. 5 |
|---|---|---|---|
| Support ring 4' | | | |
| Inner circumferential surface 4b | smooth | smooth | smooth |
| Inner diameter D (mm) | 467.4 | 467.4 | 467.4 |
| Wheel rim 3 *1 | | | |
| Uneven surface 15 | none (smooth) | provided | provided |
| Maximum outer diameter Dgmax (mm) | 469 | 470 | 469.6 |
| Minimum outer diameter Dgmin (mm) | 469 | 468 | 467.6 |
| Depression 17 | | | |
| Groove width GWb (mm) | — | 2 | 1.6 |
| Circumferential pitch Pb (mm) | — | 2 | 2 |
| Binding force (N) | 1620 | 1550 | 1480 |
| Mounting | difficult | easy | easy |
| Displacement speed (km/hr) | 270 | 370 | 370 |

*1 standardized outer diameter Dr: 469 mm

TABLE 3

| Combination C | Ref. 1 | EX. 6 | EX. 7 | EX. 8 | EX. 9 |
|---|---|---|---|---|---|
| Support ring 4 | | | | | |
| Uneven surface 13 | none(smooth) | provided | provided | provided | provided |
| Maximum inner diameter Dmax (mm) | 468 | 468.2 | 468.2 | 468.2 | 468.2 |
| Minimum inner diameter Dmin (mm) | 468 | 467.4 | 466.8 | 467.4 | 466.8 |
| Depression | | | | | |
| Groove width GWa(mm) | — | 2 | 1.2 | 2 | 1.2 |
| Circumferential pitch Pa(mm) | — | 2 | 2 | 2 | 2 |
| Wheel rim 3 | | | | | |
| Uneven surface 15 | none(smooth) | provided | provided | provided | provided |
| Maximum outer diameter Dgmax (mm) | 469 | 470 | 470 | 469.6 | 469.6 |
| Minimum outer diameter Dgmin (mm) | 469 | 468 | 468 | 467.6 | 467.6 |
| Depression | | | | | |
| Groove width GWb (mm) | — | 2 | 2 | 1.6 | 1.6 |
| Circumferential pitch Pb (mm) | — | 2 | 2 | 2 | 2 |
| Binding force (N) | 980 | 1350 | 1420 | 1290 | 1360 |
| Mounting | easy | easy | easy | easy | easy |
| Displacement speed (km/hr) | 160 | over 450 | over 450 | 430 | over 450 |

From the test results, it was confirmed that the circumferential displacement of the support ring can be effectively prevented up to very high speed, though the mounting of the support ring is easy.

The invention claimed is:

1. A combination of a wheel rim on which a pneumatic tire is mounted, and a support ring disposed in a tire cavity, the wheel rim comprising a pair of axially spaced bead seats for bead portions of the tire, and a support-ring seat for the support ring, between the bead seats, and the support ring set on the support-ring seat, and having an outer circumferential surface contacting with the inside of a tread portion of the tire mounted on the wheel rim when the tire is deflated and an inner circumferential surface, wherein the support ring comprises a radially outer annular part defining said outer circumferential surface, a radially inner annular part defining said inner circumferential surface, and a support wall between the outer annular part and the inner annular part, and said inner circumferential surface has an inside diameter such that, when the support ring is set on the support-ring seat, the inner circumferential surface of the support ring closely contacts with the support-ring seat, and the support-ring seat and the inner circumferential surface of the support ring are provided with two different ordered uneven surfaces for reducing a friction between the inner circumferential surface and the support-ring seat in the axial direction of the wheel rim, wherein the support-ring seat is provided with one of said two different ordered uneven surfaces, and the inner circumferential surface of the support ring is provided with the other ordered uneven surface, wherein the first ordered uneven surface is defined by:

parallel grooves extending in parallel with the axial direction and each having a V-shaped cross sectional shape; and parallel protrusions extending in parallel with the axial direction and having a cross sectional shape having a pointed vertex, and the second ordered uneven surface is defined by:

parallel grooves extending in parallel with the axial direction; and parallel protrusions between the parallel grooves, wherein the protrusions are axially and circumferentially spaced multiple blocks.

2. The combination according to claim 1, wherein the maximum inner diameter of the inner circumferential surface at the protrusions is 0.4 to 4.0 mm smaller than the maximum outer diameter of the support-ring seat of the wheel rim.

3. A runflat tire system comprising a pneumatic tire, and the combination of the wheel rim and the support ring according to claim 1.

4. The combination according to claim 1, wherein the support-ring seat is provided with the second ordered uneven surface.

5. The combination according to claim 1, wherein the support-ring seat is provided with the first ordered uneven surface.

6. The combination according to claim 1, wherein the support wall comprises: a circumferential wall extending continuously in the circumferential direction; and axial walls extending from the circumferential wall toward the axial edges of the support ring.

7. The combination according to claim 1, wherein the support wall comprises: a circumferential wall extending continuously in the circumferential direction; and axial walls extending from the circumferential wall toward the axial edges of the support ring, and the circumferential wall is off-centered and extends in a zigzag fashion, and the axial walls include long axial walls extending from one side of the circumferential wall towards an edge of the support ring; and short axial walls extending from the other side of the circumferential wall towards the outer edge of the support ring.

8. The combination according to claim 7, wherein the long and short axial walls extend substantially straightly from the peaks of zigzag of the circumferential wall in parallel with the axial direction.

9. The combination according to claim 1, wherein the circumferential pitch of the parallel grooves in the first ordered uneven surface is not less than 0.3 mm and not more than 4.0 mm.

10. The combination according to claim 1, wherein the circumferential pitch of the parallel grooves in the second ordered uneven surface is not less than 0.3 mm and not more than 4.0 mm.

* * * * *